(12) United States Patent
Deshpande et al.

(10) Patent No.: US 8,699,357 B2
(45) Date of Patent: Apr. 15, 2014

(54) METHODS AND APPARATUS FOR INSTABILITY DETECTION IN INTER-DOMAIN ROUTING

(75) Inventors: Shivani Deshpande, San Diego, CA (US); Tin Kam Ho, Cedar Grove, NJ (US); Marina K. Thottan, Westfield, NJ (US)

(73) Assignee: Alcatel Lucent, Paris (FR)

( * ) Notice: Subject to any disclaimer, the term of this patent is extended or adjusted under 35 U.S.C. 154(b) by 1259 days.

(21) Appl. No.: 11/564,931

(22) Filed: Nov. 30, 2006

(65) Prior Publication Data

US 2008/0130645 A1     Jun. 5, 2008

(51) Int. Cl.
*H04J 1/16* (2006.01)
*H04L 1/00* (2006.01)
*G06F 15/173* (2006.01)
*G06F 11/00* (2006.01)

(52) U.S. Cl.
USPC .............. 370/244; 370/250; 709/224; 714/25

(58) Field of Classification Search
USPC .......... 370/237, 238, 241–253; 709/238–243, 709/224; 714/25
See application file for complete search history.

(56) References Cited

U.S. PATENT DOCUMENTS

| | | | |
|---|---|---|---|
| 2006/0002292 A1* | 1/2006 | Chang et al. | 370/225 |
| 2006/0159076 A1* | 7/2006 | Bless et al. | 370/356 |
| 2007/0298812 A1* | 12/2007 | Singh et al. | 455/456.1 |
| 2008/0031257 A1* | 2/2008 | He | 370/395.31 |

OTHER PUBLICATIONS

Roughan et al., Combing Routing and Traffic Data for Detection of IP Forwarding Anomalies, Jun. 2004, 2 pages.*
Deshpande et al., Early Detection of BGP Instabilities Resulting from Internet Worm Attacks, Nov. 2004, 6 pages.*
Thottan et al., Anomaly Detection in IP Networks, Aug. 2003, pp. 2191-2204, vol. 51, No. 8.*
Y. Rekhter et al., RFC 1771—Aborder Gateway Protocol 4 (BGP-4), Mar. 1995, pp. 11-15.*
Deshpande, S.; Thottan, M.; Ho, T.K.; Sikdar, B.;, "A Statistical Approach to Anomaly Detection in Interdomain Routing,"IEEE 2006, Broadband Communications, Networks and Systems, 2006. BROADNETS 2006. 3rd International Conference on Oct. 1-5, 2006, pp. 1-10.*
Blazakis et al., Analyzing BGP ASPATH Behavior in the Internet, Apr. 2006, 9th IEEE Global Internet Symposium, All pages.*

(Continued)

*Primary Examiner* — Un C Cho
*Assistant Examiner* — Jeremy Costin
(74) *Attorney, Agent, or Firm* — Ryan, Mason & Lewis, LLP

(57) ABSTRACT

Improved techniques are disclosed for detecting instability events in data communications systems that support inter-administrative domain (inter-domain) routing. For example, a technique for detecting an instability event in a communications system supporting inter-administrative domain routing includes the following steps. At an inter-domain router, one or more features are extracted from one or more messages obtained from at least another router in the communications system. The one or more extracted features include a path length feature, a path edit distance feature, or a combination thereof. Then, the inter-domain router detects whether an instability event has occurred in the communications system based on the one or more extracted features such that an action can be effectuated. By way of example, the one or more messages may include one or more border gateway protocol update messages and the inter-domain router may be a border gateway protocol router.

20 Claims, 9 Drawing Sheets

(56) References Cited

OTHER PUBLICATIONS

Zhang et al., On Detection of Anomalous Routing Dynamics, 2004, from N. Mitrou et al. (Eds): Networking 2004, LNCS 3042, pp. 259-270.*

J. Wu et al., "Finding a Needle in a Haystack: Pinpointing Significant BGP Routing Changes in an IP Network," Procs. of Networked Systems Design and Implementation, May 2005, pp. 1-14, Boston, MA.

J. Zhang et al., "Learning-Based Anomaly Detection in BGP Updates," Procs. of the 2005 ACM Mine Net Workshop, Aug. 2005, pp. 219-220, Philadelphia, PA.

S.T. Teoh et al., "Visual-Based Anomaly Detection for BGP Origin Change Events," Procs. of the 14th IFIP/IEEE Workshop on Distributed Systems: Operations and Management, Oct. 2003, pp. 155-168, Germany.

S.T. Teoh et al., "Combining Visual and Automated Data Mining for Near-Real-Time Anomaly Detection and Analysis in BGP," Procs. of CCS Workshop on Visualization and Data Mining for Computer Security, ACM Conference on Computer and Communications Security, Oct. 2004, pp. 35-44, Washington, DC.

T.K. Ho, "Mirage: Interactive Tools for Pattern Discovery," In Procs. of the 17th International Conference on Pattern Recognition, Aug. 2004, pp. 509-512, U.K.

J. Wang et al., "Online Selecting Discriminative Tracking Features Using Particle Filter," IEEE Computer Society Conference on Computer Vision and Pattern Recognition, CVPR, Jun. 2005, pp. 1037-1042, vol. 2, San Diego, CA.

T.K. Ho et al., "Complexity Measures of Supervised Classification Problems," IEEE Transactions on Pattern Analysis and Machine Intelligence, Mar. 2002, pp. 289-300, vol. 24, No. 3.

A. Bremler-Barr et al., "Improved BGP Convergence via Ghost Flushing," Proc. of IEEE Infocom, Mar. 2003, 11 pages, San Francisco, CA.

N. Feamster, "Practical Verification Techniques for Wide Area Routing," ACM SIGCOMM Computer Communication Review, Jan. 2004, pp. 87-92, vol. 34, Issue 1.

D. Pei et al., "BGP-RCN: Improving BGP Convergence Through Root Cause Notification," Computer Networks and ISDN Systems, Jun. 2005, pp. 175-194, vol. 48, No. 2.

D. Pei et al., "Route Diagnosis in Path Vector Protocols," ACM SIGCOMM Poster Session, Poster Session, Technical Report TR040039, Sep. 2004, pp. 1-14.

D. Pei et al., "Improving BGP Convergence Through Consistency Assertions," Proc. of IEEE Infocom, Jun. 2002, pp. 902-911, New York, NY.

S. Deshpande et al., "Early Detection of BGP Instabilities Resulting from Internet Worm Attacks," Proc. of IEEE Globecom, Nov. 2004, 6 pages, Dallas, TX.

B. Zhang et al,, "Timer Interaction in Route Flap Dampening," Procs. of the 25th International Conference on Distributed Computing Systems (ICDCS), Jun. 2005, pp. 393-403, Columbus, OH.

H. Wang et al., "Characterizing the Performance and Stability Issues of the AS Path Prepending Method: Taxonomy, Measurement Study and Analysis," ACM SIGCOMM Asia Workshop, Apr. 2005, China.

M. Roughan et al., "Combining Routing and Traffic Data for Detection of IP Forwarding Anomalies," Procs. of ACM SIGCOMM NeTs Workshop, Aug. 2004, 2 pages, Portland, Oregon.

M. Lad et al., "Analysis of BGP Update Surge During the Slammer Worm Attack," 5th International Workshop on Distributed Computing (IWDC), pp. 66-79, Dec. 2003, India.

M. Thottan et al., "Anomaly Detection in IP Networks," IEEE Transactions on Signal Processing, Aug. 2003, pp. 2191-2204, vol. 51, No. 8.

Z. Mao et al., "Route Flap Dampening Exacerbates Internet Routing Convergence," Procs. of the 2002 Conference on Applications, Technologies, Architectures and Protocols for Computer Communications, Aug. 2002, pp. 221-233, Pittsburgh, Pennsylvania.

L. Wang et al., "Observation and Analysis of BGP Behavior Under Stress," Procs. of ACM SIGCOMM Internet Measurement Workshop, Nov. 2002, pp. 183-195, France.

C. Labovitz et al., "Delayed Internet Routing Convergence," Procs. of SIGCOMM, Aug. 2000, pp. 175-187, Sweden.

Réseaux IP Européens Network Coordination Center, Projects—RIS, http://www.ripe.net/projects/ris/rawdata.html, pp. 1-3.

J. Cowie et al., "Global Routing Instabilities Triggered by Code Red II and Nimda Worm Attacks," Technical Report, Renesys Corporation, Dec. 2001, pp. 1-11.

R.A. Wagner et al., "The String-to-String Correction Problem," Journal of the Association for Computing Machinery, pp. 168-173, Jan. 1974, vol. 21, No. 1.

H. Akaike, "Information Theory and an Extension of the Maximum Likelihood Principle," Procs. of the Second International Symposium on Information Theory, 1973, pp. 1-10, Hungary.

U. Appel et al., "Adaptive Sequential Segmentation of Piecewise Stationary Time Series," Information Sciences, 1983, pp. 27-56, vol. 29.

* cited by examiner

FIG. 3B

| | AS # | AS PATHS RECEIVED | ALL AVAILABLE PATHS TO d | AS PATHS SENT |
|---|---|---|---|---|
| | | | STAGE I | |
| 301 | AS6 | AS7 ← w | NONE | w → AS4, AS2 |
| | AS5 | NONE | | NONE |
| | AS4 | NONE | [4-6-7d, 3-1-7d] | NONE |
| | AS3 | NONE | [6-7d, 1-7d, 3-1-7d, 2-6-7d] | NONE |
| | AS2 | NONE | [1-7d, 4-6-7d, 2-6-7d] | NONE |
| | AS1 | AS7 ← w | [6-7d, 1-7d, 3-1-7d, 4-6-7d] | 1-4-6-7d → AS3, AS2; w → AS4 |
| | | | [4-6-7d, 2-6-7d] | |
| | | | STAGE II | |
| 302 | AS4 | AS1 ← w | [6-7d, 3-1-7d, 2-6-7d] | NONE |
| | AS3 | AS1 ← 1-4-6-7d | [4-6-7d, 2-6-7d, 1-4-6-7d] | 3-4-6-7d → AS1, AS2, AS5; w → AS4 |
| | AS2 | AS1 ← 1-4-5-7d | [6-7d, 3-1-7d, 4-6-7d, 1-4-6-7d] | NONE |
| | | | STAGE III | |
| 303 | AS4 | AS6 ← w | [3-1-7d, 2-6-7d] | 4-3-1-7d → AS2, AS5, AS6, AS1; w → AS3 |
| | AS2 | AS6 ← w | [3-1-7d, 4-6-7d, 1-4-6-7d] | 2-3-1-7d → AS1, AS2, AS4, AS6; w → AS3 |
| | | | STAGE IV | |
| 304 | AS5 | AS3 ← 3-4-6-7d | [4-6-7d, 3-4-6-7d] | NONE |
| | AS4 | AS3 ← w | [2-6-7d] | 4-2-6-7d → AS3; w → AS2; MRAI → AS1, AS6, AS5 |
| | AS2 | AS3 ← 3-4-6-7d | [4-6-7d, 3-4-6-7d, 1-4-6-7d] | 2-4-6-7d → AS3, w → AS4, MRAI → AS1, AS6 |
| | AS1 | AS3 ← 3-4-6-7d | [4-6-7, 2-6-7d]; | NONE |
| | | | STAGE V | |
| 305 | AS5 | AS4 ← 4-3-1-7d | [4-3-1-7d, 3-4-6-7d] | NONE |
| | AS4 | AS2 ← 2-3-1-7d | [2-3-1-7d] | w → AS2; MRAI → AS1, AS3, AS5, AS6 |
| | AS3 | AS2 ← w | [4-6-7d, 1-4-6-7d] | NONE |
| | AS2 | AS4 ← 4-3-1-7d | [3-4-6-7d, 4-3-1-7d, 1-4-6-7d] | 2-3-4-6-7d → AS4; w → AS3; MRAI → AS1, AS6 |

FIG. 4A

Algorithm 1 Change detection and optimal boundary location.

$s = L$; set $s$ as the end of the learning window and start of the test window
while ($sizeof(data) > 0$) do
    while ($d(s, s + L - 1) < \delta$) do
        $s = s + 1$;   grow the learning and slide the test window by one sample
    end while
    $t_D = s + L - 1$;   the change detection point
    $r = t_D - L + 1$;   pointer to the beginning of the current test window
    for ($t_D - L + 2 \leq s \leq t_D$) do
        $g_1 = d(s, s + L - 1)$;   GLR distance between the growing learning–fixed test windows
        $g_2 = d(r, s + L - 1)$;   GLR distance between the fixed learning–growing test windows
        if ($g_1 > g_2$) then
            $r = s$;   detected a better boundary position
        end if
        $s = s + 1$;
    end for
    $r\ opt = r$;   optimal boundary position found
    $data = [data(r) : data(sizeof(data))]$;   further segmentation on remaining data
end while
Note: $L$: minimum initial window size; $\delta$: GLR threshold;
$d(x,y)$: GLR distance between windows $[1, x]$ and $[x + 1, y]$.

*FIG. 4B*

Algorithm 2 Processes for online alarm clustering.

$n$; number of traces = 2 * number of peers
$a_i$; alarm for trace $i$, $i = 1, 2, ..., n$
$t(a_i)$; time at which alarm $a_i$ occurs
$\tau$; maximum time interval between alarms in the same cluster
$N(a_i)$; The cluster of alarms in the neighborhood of alarm $a_i$
$A$; Final alarm indicating an instability event

FOR EVERY ALARM $a_i$
Set a timer for $\tau$; A timer that inactivates the alarm at after $\tau$
Set $N(a_i) = a_i$; include the alarm in its own neighborhood
if ($a_j$ still active and $i \neq j$) then
   Include $a_i$ in $N(a_j)$; include alarm $a_i$ in the neighborhood of other active alarms
end if

SUBROUTINE FOR TIMER EXPIRATION
if ($N(a_i)$) then
   Delete $N(a_i)$; Delete the neighborhood of the alarm
   Delete $a_i$ from all $N(a_j)$; Delete the alarm from any other neighborhood
end if
Delete $a_i$;

BACKGROUND PROCESS
if ($|N(a_i)| \geq \frac{n}{2}$) then
   $A = TRUE$; A significant instability event detected
   Delete $N(a_i)$; Delete the alarm and its neighborhood
   Delete $a_i$ from all $N(a_j)$;
   Delete $a_i$;
end if

US 8,699,357 B2

METHODS AND APPARATUS FOR INSTABILITY DETECTION IN INTER-DOMAIN ROUTING

FIELD OF THE INVENTION

The present invention relates to data communications systems and, more particularly, to techniques for detecting instability events in data communications systems that support inter-administrative domain (inter-domain) routing.

BACKGROUND OF THE INVENTION

It is known that the Internet is divided into tens of thousands of Autonomous Systems. Each Autonomous System (AS) is an independently administrated domain. The routing information within an AS is maintained by Interior Gateway Protocols (IGPs), while the Border Gateway Protocol (BGP) is employed to maintain and exchange inter-domain routing information among the various Autonomous Systems (ASs).

Stability of inter-domain routing is of critical importance to maintain the connectivity and reliability of data communications systems such as the Internet. However, since inter-domain exchange of traffic is between different administrative domains, the process of routing is highly dependent on the local rules of these domains. Fortunately, not all route changes can cause instability.

Examples of events that do result in anomalous route changes are infrastructure failures (e.g., due to disasters like hurricanes or earthquakes), power outages (e.g., large scale events like the blackout in Northeastern United States in August 2003), worm attacks and BGP router misconfigurations. Such anomalous route changes and the impact of local rules on these route changes can be observed by monitoring the BGP update messages seen at the peering points. However, monitoring BGP updates is a challenging task since there are multiple prefixes that need to be monitored.

There has been recent work focusing on the detection of routing anomalies using BGP update message data. In J. Wu et al., "Finding a Needle in a Haystack: Pinpointing Significant BGP Routing Changes in an IP Network," Proceedings of Networked Systems Design and Implementation, Boston, Mass., May 2005, a system is proposed that can be used for online generation of routing disruption reports. However, the system focuses on identifying events that originate close to the observation point and thus may not be effective in detecting wide-spread instabilities far from their observation point.

A learning-based approach described in J. Zhang et al., "Learning-Based Anomaly Detection in BGP Updates," Proceedings of the 2005 ACM MineNet Workshop, pp. 219-220, Philadelphia, Pa., August 2005, proposes the use of wavelet transformations to determine patterns of BGP update-dynamics, which translates the problem into the wavelet domain. However, there is a loss of time granularity as a result of requiring sufficient sample support for accurate estimation of the wavelet basis.

The methods disclosed in S. T. Teoh et al., "Visual-based Anomaly Detection for BGP Origin Change Events," Proceedings of the 14$^{th}$ IFIP/IEEE Workshop on Distributed Systems: Operations and Management, pp. 155-168, Heidelberg, Germany, October 2003, and S. T. Teoh et al., "Combining Visual and Automated Data Mining for Near-Real-Time Anomaly Detection and Analysis in BGP," Proceedings of CCS Workshop on Visualization and Data Mining for Computer Security, ACM Conference on Computer and Communications Security, pp. 35-44, Washington, D.C., October 2004, utilize visual-based techniques for the detection and location of the instabilities. In such approaches, data mining techniques are used to render the data free of noise and translate the data into graphical views for easier identification by a human operator.

Nonetheless, improved techniques for detecting instability events in data communications systems that support inter-domain routing are needed.

SUMMARY OF THE INVENTION

Principles of the invention provide improved techniques for detecting instability events in data communications systems that support inter-administrative domain (inter-domain) routing.

By way of example, in a first aspect of the invention, a method of detecting an instability event in a communications system supporting inter-administrative domain routing includes the following steps. At an inter-domain router, one or more features are extracted from one or more messages obtained from at least another router in the communications system. The one or more extracted features include a path length feature, a path edit distance feature, or a combination thereof. Then, the inter-domain router detects whether an instability event has occurred in the communications system based on the one or more extracted features such that an action can be effectuated. Advantageously, instability detection may thus be based on the path length feature alone, the path edit feature alone, or a combination of the two feature types.

The extracting step may generate a time series trace collected over a given time interval, and the detecting step may perform a statistical analysis on the time series trace. However, it is to be appreciated that the extracted features can be in a form other than a time series trace. By way of further example only, they may be in the form of a spatial series trace. Furthermore, any appropriate detection process may be employed on the extracted features.

The one or more messages may include one or more border gateway protocol update messages and the inter-domain router may be a border gateway protocol router.

Further, the action to be effectuated may include invocation of an instability event policy, or generation of an alarm to signal the occurrence of an instability event to a network operator.

The extracting step may further include extracting a message volume feature. The message volume feature may include a withdrawal message volume feature.

The detecting step may include an adaptive sequential segmentation process. Further, the detecting step may include a generalized likelihood ratio based hypothesis test. Still further, the detecting step may include determining an optimal boundary position within the times series trace. The optimal boundary position determining step may further include use of a test window and a learning window for making the optimal boundary position determination. The optimal boundary position determining step may further include using different combinations of sizes of the test window and the learning window to detect a position where a maximum change occurs between the two windows. Yet further, the detecting step may include correlating results of the statistical analysis of two or more feature traces prior to effectuating the action.

In a second aspect of the invention, an article of manufacture for detecting an instability event in a communications system supporting inter-administrative domain routing, includes a machine recordable medium containing one or more programs stored thereon which when executed implement the steps of extracting, at an inter-domain router, one or more features from one or more messages obtained from at least another router in the communications system, wherein the one or more extracted features comprise at least one of a path length feature and a path edit distance feature; and detecting, at the inter-domain router, whether an instability event has occurred in the communications system based on the one or more extracted features such that an action can be effectuated.

In a third aspect of the invention, apparatus for detecting an instability event in a communications system supporting inter-administrative domain routing, includes: a memory; and a processor coupled to the memory and operative to: (i) extract, at an inter-domain router, one or more features from one or more messages obtained from at least another router in the communications system, wherein the one or more extracted features comprise at least one of a path length feature and a path edit distance feature; and (ii) detect, at the inter-domain router, whether an instability event has occurred in the communications system based on the one or more extracted features such that an action can be effectuated.

In a fourth aspect of the invention, an inter-domain router configured to detect an instability event in a communications system supporting inter-administrative domain routing includes: a feature extractor for extracting one or more features from one or more messages obtained from at least another router in the communications system, wherein the one or more extracted features comprise at least one of a path length feature and a path edit distance feature; and a change detector, coupled to the feature extractor, for detecting whether an instability event has occurred in the communications system based on the one or more extracted features such that an action can be effectuated.

These and other objects, features and advantages of the present invention will become apparent from the following detailed description of illustrative embodiments thereof which is to be read in connection with the accompanying drawings.

BRIEF DESCRIPTION OF THE DRAWING

FIG. 3B illustrates a table of initial states of nodes in the topology of FIG. 3A.

FIG. 4A illustrates a change detection and optimal boundary location algorithm, according to an embodiment of the invention.

FIG. 4B illustrates an online alarm clustering algorithm, according to an embodiment of the invention.

DETAILED DESCRIPTION OF PREFERRED EMBODIMENTS

Figure 1:
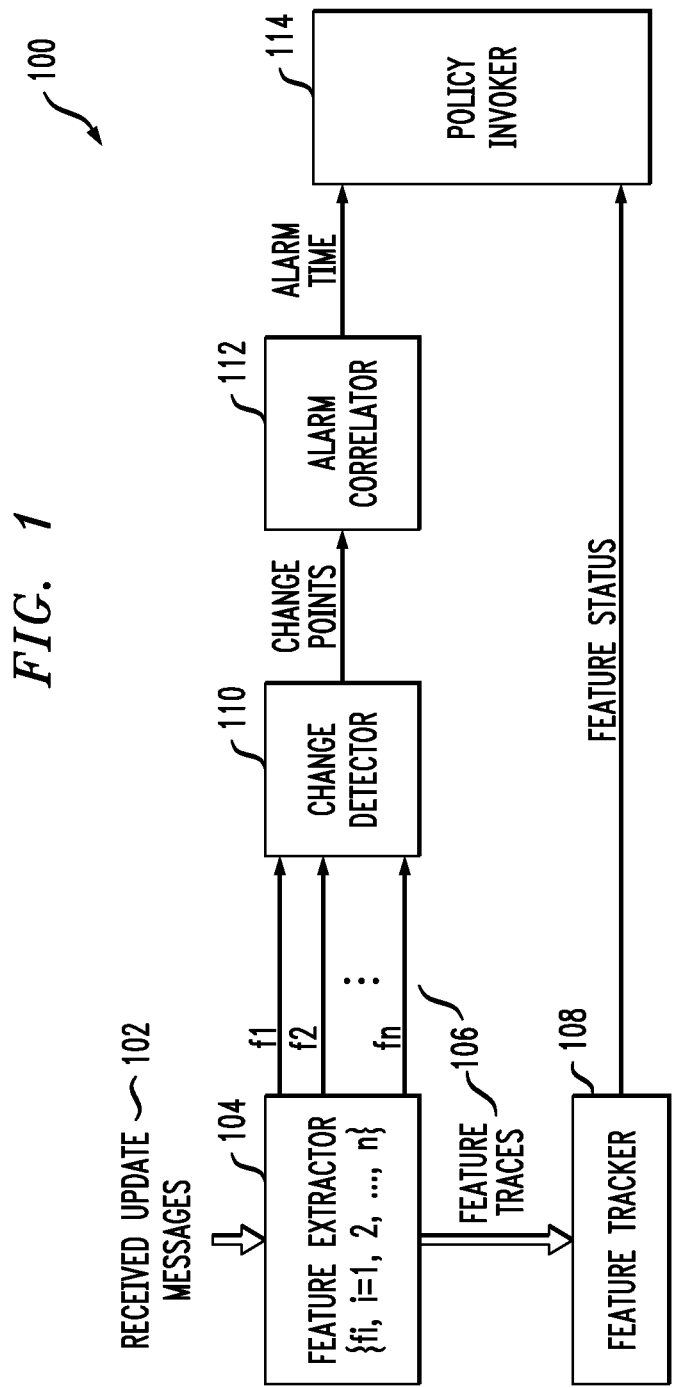
FIG. 1 illustrates an instability event detection system, according to an embodiment of the invention.

The following description will illustrate principles of the invention in the context of a data communications system that supports inter-domain routing, such as an Internet Protocol (IP) based communications system. It should be understood, however, that principles of the invention are not necessarily limited to use with any particular type of communications system. Principles of the invention are instead more generally applicable to any inter-domain-supportive communications system in which it is desirable to detect instability events and to invoke policies that react to (or preempt) effects associated with such instability events.

In one illustrative embodiment described herein, an inter-domain router, such as a border gateway protocol (BGP) router, uses an online statistical time series based approach for detecting the occurrence of anomalies (instability events) in border gateway protocol (BGP) route update messages. It is to be appreciated that principles of the invention provide a detection mechanism that can be implemented on a single BGP router, i.e., without the need for a distributed infrastructure. It is to be further appreciated that "online' generally means at runtime, i.e., during normal operation time of the router. The detection mechanism of the invention could, however, be implemented offline (i.e., not during runtime or normal operation time of the router).

Furthermore, the router preferably performs the online statistical time series based approach via a time domain analysis of features extracted from BGP update message data. The router also preferably uses a learning-based algorithm for robust detection. Filtering techniques may be used to smooth noisy traces and then adaptive segmentation techniques may be used to capture abnormalities in the data. The correlated presence of abnormalities across several features is used to reduce the occurrence of false positives in the detection. Further, features are preferably used that efficiently exhibit a distinct pattern of behavior during any anomalous period irrespective of the root cause event. This ensures accurate performance of the detection algorithm for many different kinds of events, independent of the training dataset. The detection of the onset of an instability event is the first step towards isolating an anomalous period, after which effective root cause analysis can be performed.

In accordance with principles of the invention, instability detection may advantageously be based on a path length feature alone, a path edit feature alone, or a combination of the two feature types. These features will be described in detail below. Furthermore, while the online statistical time series based approach described herein may be used, other appropriate detection processes may be employed on the extracted features.

The remainder of the detailed description is organized as follows: Section I describes an illustrative system architecture; Section II describes a feature selection process; Section III explains a detection process; Section IV explains a parameter estimation process; Section V explains possible policies that may be invoked by the system; and Section VI explains an illustrative processing architecture for a router implementing the detection process.

I. System Architecture

In this section, components of an illustrative system used to implement the instability detection methodology of the invention are described. As mentioned above, this architecture is preferably implemented in a single BGP router. Further, advantageously, the functionalities that these components perform do not significantly add to the computational load on the router.

As shown, the input data to system 100 is one or more BGP update messages 102 received by any BGP router from its peers as part of its normal routing operations. System 100 includes feature extractor 104, feature tracker 108, change detector 110, alarm correlator 112, and policy invoker 114. Each component is described below.

Feature extractor 104 parses the update messages 102 received from each peer separately. In one illustrative embodiment, feature extractor 104 extracts features (fi, i=1, 2, ..., n) from successive 5-minute intervals to obtain feature trace(s) 106. The features used in such embodiment are described below in section II.

Change detector 110 monitors the feature time series (traces 106) and detects a change in feature behavior. An illustrative detection algorithm is described in below in section III. Change detection is preferably performed over every feature trace from each peer in parallel.

Alarm correlator 112 is used to make the detection more robust against feature volatility. An illustrative correlator algorithm is also described below in section III. The algorithm determines the correlation between features based on change points received from change detector 110. The algorithm further determines the extent of a detected instability by correlating alarms across various peers.

Policy invoker 114 invokes one of several possible route quarantine policies in response to instability detected by alarm correlator 112. Some example policies are described below in section V. Alternatively, as opposed to employing the policy invoker, the BGP router implementing principles of the invention can be configured to raise an alarm to signal the occurrence of an instability to a network operator.

Feature tracker 108 is used together with policy invoker 114. The feature tracker monitors the behavior of the features for the continued presence of anomalous symptoms after detection of an instability. Once the features appear to return to normality, the policy invoker is notified (i.e., via a feature status message) and the route selection process is switched back to normal. The feature tracker can be a very simple threshold-based mechanism which tracks the levels of the different features being used. The feature tracker preferably implements a timer-based mechanism to readjust its thresholds to guard against a permanent policy switch after a false positive.

II. Feature Selection

In this section, we describe features that may be selected for extraction for use in an instability detection methodology, according to an embodiment of the invention. Feature extractor 104 of FIG. 1 extracts such features.

It is realized that route fluctuations caused by any failure event cause an immediate effect on the route advertisement and message exchange operations of a BGP router. The update messages exchanged between routers directly reflect the effect of any anomaly. Hence, their contents form the data for the detection methodology, according to an illustrative embodiment of the invention. In order to ensure accurate detection, the methodology uses those features of this data that show distinct behavior during normal and anomalous periods.

As will be see, we extract several features (described below) from the BGP update messages and identify the most useful ones using scatter plots in Mirage (T. K. Ho, "Mirage: Interactive Tools for Pattern Discovery," In Procs. of the 17$^{th}$ International Conference on Pattern Recognition, pp. 509-512, Cambridge, U.K., August 2004). The selected features are used in the form of a time series (or trace) collected every five minutes. We also use median filtering in order to smooth out any unwanted transients in the feature traces.

A. Message Volumes

The first feature considered is message volume. Inter-domain routing instabilities are characterized by a sharp and sustained increase in the number of announcement and withdrawal messages exchanged by many of the BGP routers.

Figure 2A:
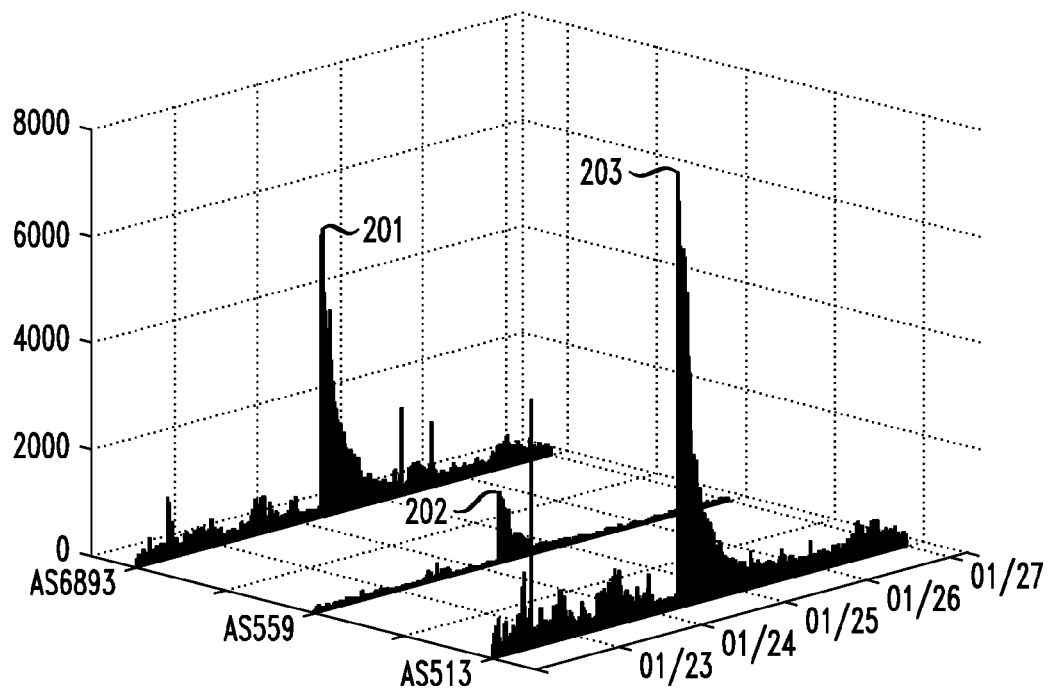
FIGS. 2A and 2B illustrate message volumes for two periods of instability, according to an embodiment of the invention.

By way of example, FIG. 2A illustrates message volume for certain ASs from the 23$^{rd}$ to the 27, Jan. 2003. The Slammer worm attacked the Internet on the 25, Jan. 2003. A large, relative peak in the number of announcements and withdrawals received at a router from its peers was coincidental with the duration of this event, i.e., see message peaks 201, 202 and 203 occurring on Jan. 23, 2003 in FIG. 2A.

Figure 2B:
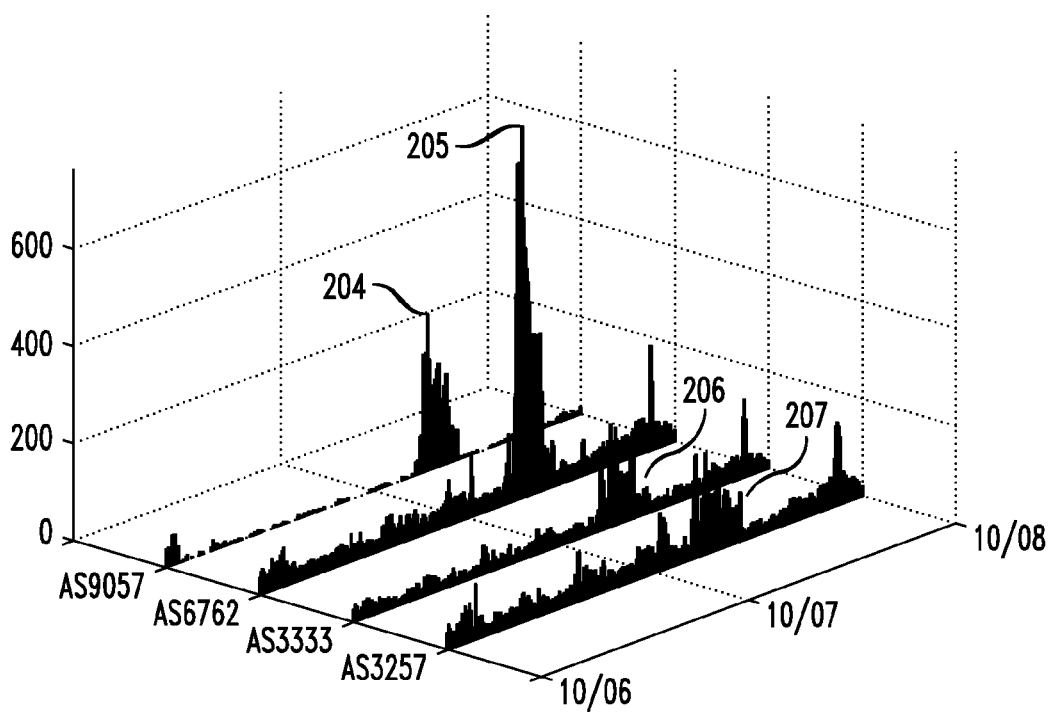

By way of further example, on Oct. 7, 2001, AS2008 and AS3300 leaked private AS numbers from their confederation space due to a misconfiguration on their BGP routers. FIG. 2B illustrates message peaks 204, 205, 206 and 207 that occurred on affected ASs on that day.

B. AS Path Length

The next feature considered is AS path length. In case of any failure, an BGP path exploration process is triggered for the failed routes. As a result, every router involved will try to search for possible alternate paths to the destination until either the path is completely withdrawn or a valid back up path is established and the topology converges.

Figure 3A:
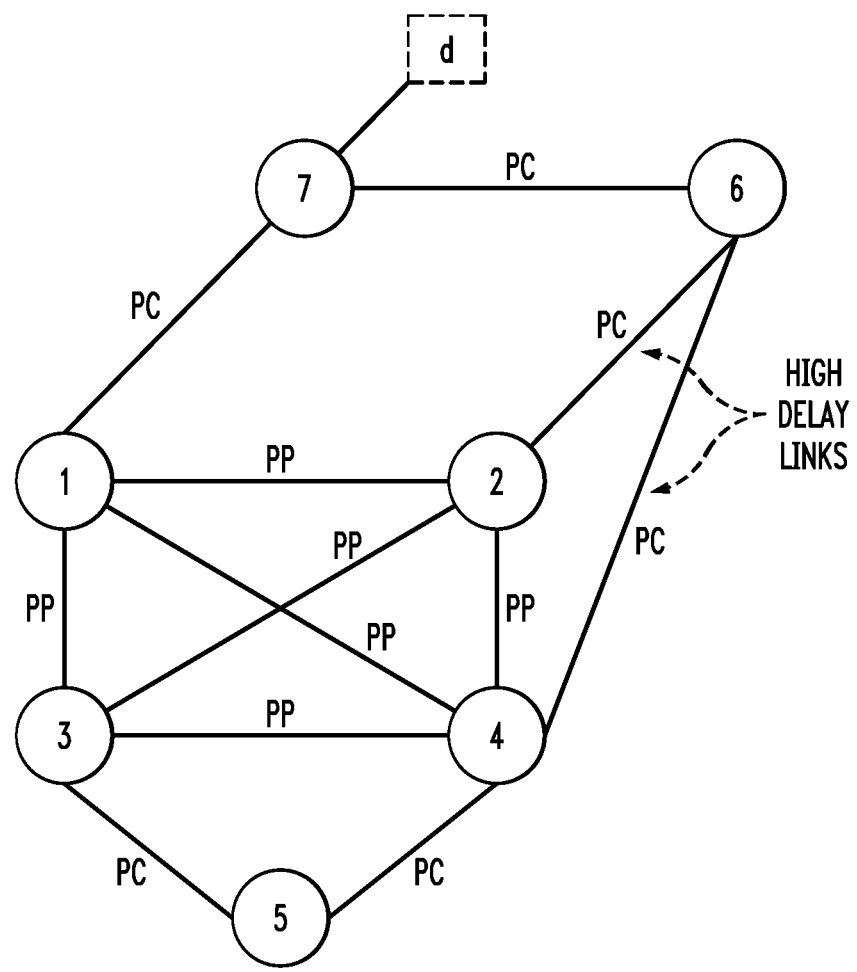
FIG. 3A illustrates an example network topology of nodes, according to an embodiment of the invention.

For example, consider the topology in FIG. 3A. Each numbered node represents a different AS (AS1 through AS7) with a single BGP router. We consider paths for the destination prefix "d" advertised by the router in AS7. The link labels denote the peering relationship between two nodes in their numeric order. For example, link [6-7] is a [P-C] link indicating that AS6 is a message provider (P) for message customer (C) AS7. We assume the shortest path first policy at all nodes with a tie resolved according to the local rules. For example, AS2 always prefers routes learned from AS3 over those learned from AS4, if both the routes are of the same length. Note that the links between AS6 and its providers, AS2 and AS4, are high delay links.

The table in FIG. 3B shows the sequence of update messages exchanged between nodes after the path to destination "d" is withdrawn by AS7 due to some failure. The first stage lists the conditions after withdrawals sent by AS7 are received at AS6 and AS1. A stage is defined by the receipt and processing of one or more messages and transmission of resulting route updates by any node. We do not show the entire process (eight stages) until convergence, but only the initial five stages (301, 302, 303, 304 and 305, respectively) for illustration.

Figure 3C:
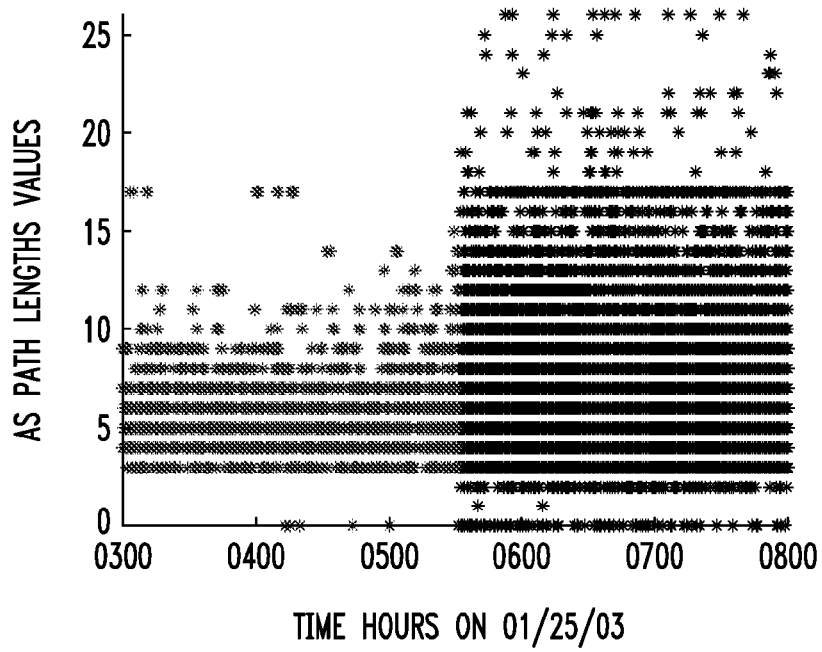
FIG. 3C illustrates a graphical plot of messages with different path lengths, according to an embodiment of the invention.

The table shows that the lengths of AS paths received at most of the AS nodes increase at successive stages. For instance, the sequence of AS paths received at node 2 is: from AS1-[1-7; 1-4-6-7], AS3-[3-1-7; 3-4-6-7] and AS4-[4-6-7; 4-3-1-7]. Thus, the length of the AS paths received for the same destination changes from two to four hops. This effect is more prominent in the Internet due to high connectivity of the routers, as illustrated in FIG. 3C. FIG. 3C shows AS path length values as a function on time on the day the Slammer worm attacked the Internet (Jan. 23, 2003).

We call the mode values of the distribution of AS path lengths as the "normal value of AS path length" and denote it by $nv_l$. The number of messages received with AS path lengths differing from this normal value is negligible during normal periods of operation but shows a prominent increase under instability conditions (see FIG. 3C).

Another reason for the receipt of routes with abnormally large AS path lengths upon failure events is AS path prepending that is very commonly used in the Internet to achieve traffic engineering. AS path prepending is when a BGP router prepends its AS number multiple times consecutively instead of just once to an AS path it advertises. This is done to make it less attractive to the BGP peers that base their route selection on the shortest path length criteria. As a result, these routes are the very rarely used backup routes. During a failure, these routes are also eventually selected when all other shorter routes fail and so, can form a considerable percentage of the number of AS paths received by a BGP router. Note that the AS path length that we preferably use is just the count of AS numbers listed in the AS path sequence received in the message and may not necessarily be a unique list of AS numbers.

We use separate traces corresponding to each observed value of the AS path length as a feature trace. Thus, the AS path length feature set can be defined as:

$$ASPL=\{\overline{X}_{ij}=\langle x_0,x_1,\ldots\rangle; i=1,\ldots,M_l; j=1,\ldots,NP\} \quad (1)$$

where, $\overline{X}_{ij}$ is a time series of the number of messages with AS path length=i, received over every five minute interval from peer number j, $M_l$ is the maximum observed AS path length value and NP is the number of peers of the local BGP router.

C. AS Path Edit Distance

The next feature considered is AS path edit distance. During an instability event, not only are a large number of long AS paths exchanged but also a large number of "rare" AS paths are advertised. We quantify the later effect by treating AS paths received in consecutive messages (for the same prefix) as strings and obtaining edit distances between them as a measure of their dissimilarity. We define the edit distance between any two AS paths as the minimum amount of AS number substitutions, deletions and insertions (or combinations thereof) needed to convert one path into another.

As an example, consider the sequence of messages received at AS2 from AS6 [6-1-7; 6-4-3-1-7]. The edit distance between these AS paths can be counted as two insertions. If on the other hand, because of a link failure between AS6 and AS7, the path advertised by AS2 to AS3 changes from [2-6-7] to [2-1-7], then the edit distance between the two AS paths will be one substitution.

Figure 3D:
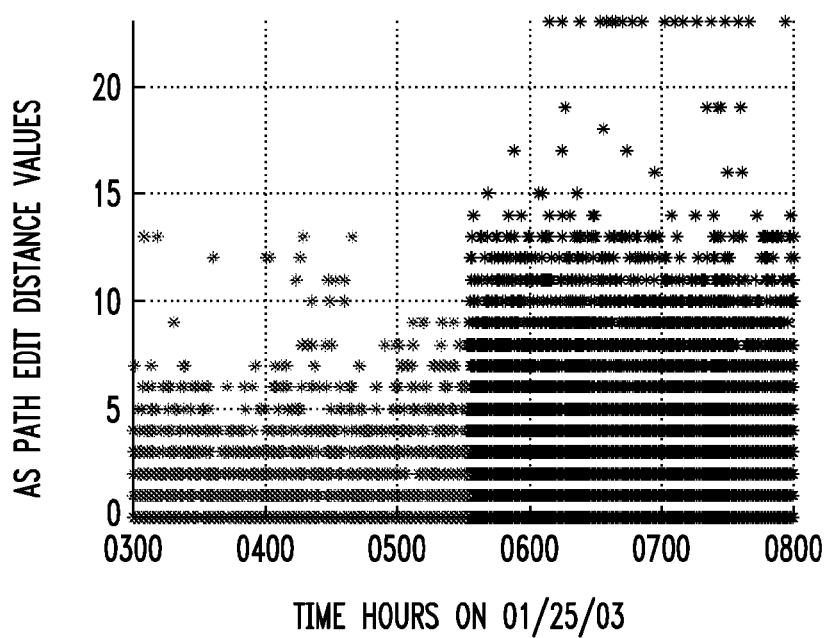
FIG. 3D illustrates a graphical plot of messages with different pairwise path edit distances, according to an embodiment of the invention.

We denote the mode of the AS path edit distance value distribution as $nv_{ed}$, i.e., the "normal value for AS path edit distance." During an instability event, as all possible paths for a particular prefix are exchanged, a large number of successive messages show higher edit distances (more than $nv_{ed}$). FIG. 3D shows this effect for the Slammer worm attack. In order to capture the effect of the instability on the AS path edit distance feature, we use separate feature traces corresponding to each observed value.

Thus, the AS path edit distance feature set is defined as:

$$ASPED=\{\overline{X}_{ij}+\langle x_0,x_1,\ldots,\rangle; i=1,\ldots,M_{ed}; j=1,\ldots,NP\} \quad (2)$$

where, $\overline{X}_{ij}$ is a time series of the number of messages with AS path edit distance=i, received over every five minute interval from peer number j, $M_{ed}$ is the max, observed AS path length value and NP is the number of peers of the local BGP router.

D. Relevant Features

After exploring the features mentioned above, our available feature set is:

$$F'=[AV,WV,ASPL,ASPED] \quad (3)$$

where, AV and WV are the volume feature sets, i.e., the time series of the number of announcements and withdrawals received from each peer, respectively, ASPL is the AS path length and ASPED the AS path edit distance feature set.

Since the maximum values of AS path length ($M_l$) and edit distance ($M_{ed}$) observed can be very high, the dimensionality of this feature set can also be very high. Hence, we employ a filtering method to retain only highly discriminatory and relevant feature traces to be used for detection.

In this illustrative embodiment, we discard the announcement feature trace as it shows a very high correlation with the AS path length feature traces. We also filter out the feature traces corresponding to the normal AS path length ($nv_l$) and normal AS path edit distance ($nv_{ed}$) values. This is done since the prime observation that characterized the anomalous behavior pattern was the increase in number of messages with "ab"-normal values of the features. The features are then selected based on their discrimination capability or feature efficiency. While a variety of known techniques for computing discrimination capability or feature efficiency can be used, one illustrative method is based on the Fisher's Linear Discriminant (see, e.g., J. Wang, X. Chen and W. Gao, "Online Selecting Discriminative Tracking Features Using Particle Filter," IEEE Computer Society Conference on Computer Vision and Pattern Recognition, CVPR vol. 2, pp. 1037-1042, San Diego, Calif., June 2005, and T. K. Ho and Mitra Basu, "Complexity Measures of Supervised Classification Problems," IEEE Transactions on Pattern Analysis and Machine Intelligence, vol. 24, no. 3, pp. 289-300, March 2002). The value of $nv_l$ observed for all of the datasets we use is in the range (4, 5) and the value of $nv_{ed}$ in the range (0, 1). The values for $nv_l$ and $nv_{ed}$ can vary for different BGP routers and are selected by observing the behavior of the edit distance traces received by the router for an extended period of normal operation.

Thus, for data from each peer, the final feature set that we use for instability event detection has nine traces:

F=[WV,ASPL',ASPED']

where, $ASPL'=[\overline{X}_{ij}|i=3,6,7,8; j=1,2,\ldots,NP]$;

$ASPED'=[\overline{X}_{ij}|i=2,3,4,5; j=1,2,\ldots,NP]$

III. Detection Algorithm

In this section, we describe an instability detection algorithm, according to an embodiment of the invention. This algorithm is implemented in change detector 110 of FIG. 1. Also described is an alarm correlation algorithm which is implemented in alarm correlator 112 of FIG. 1.

The detection algorithm employed in accordance with an illustrative embodiment of the invention is based on adaptive sequential segmentation. The core of the segmentation is change detection using a Generalized Likelihood Ratio (GLR) based hypothesis test. We give a detailed description of the GLR technique in Section III-A, and then follow with the various steps associated with the algorithm used for overall segmentation in Sections III-B, III-C and III-D.

During the explanation of the steps of the overall detection methodology, the reader may refer to the pseudo-code depicted in FIGS. 4A and 4B for illustrative purposes. More particularly, FIG. 4A illustrates pseudo-code for the described embodiment of the change point detection and optimal boundary location steps, while FIG. 4B illustrates pseudo-code for the described embodiment of the on-line alarm clustering steps.

A. Generalized Likelihood Ratio Test

We will give the details of the basic GLR test used for change detection in this section. The non-stationary feature time series is represented in terms of piecewise stationary segments of data called the learning and test windows.

Thus, consider a learning window L(t) and test window S(t) of lengths $N_L$ and $N_S$ respectively. They can be represented as:

$$L(t)=\{l(t_1),l(t_2),\ldots,l(t_{N_L})\}$$

$$S(t)=\{s(t_1),s(t_2),\ldots,l(t_{N_S})\} \quad (4)$$

Any $l(t_i)$ (or $s(t_i)$) in the equation above can be expressed as $\tilde{l}(t_i)$ where $\tilde{l}(t_i)=l(t_i)-\mu$ and $\mu$ is the mean of the segment L(t). Now, $\tilde{l}(t_i)$ can be modeled as an auto-regressive (AR) process of order p with a residual error $\epsilon(t_i)$ $$\epsilon(t_i) = \sum_{k=0}^{p} \alpha_{lk}\tilde{l}(t_i - k) \quad (5)$$

where $\alpha_L=\{\alpha_{l1},\alpha_{l2},\ldots,\alpha_{lp}\}$ and $\alpha_0=1$ are the AR parameters. Assuming each residual time is drawn from an $N(0,\sigma_L^2)$ distribution, the joint likelihood of the residual time series for the learning window is given by $$p(\epsilon(t_{p+1}),\ldots,\epsilon(t_{N_L})|\alpha_{l1},\ldots,\alpha_{lp}) = \left(\frac{1}{\sqrt{2\pi\sigma_L^2}}\right)^{\hat{N}_L} e^{\left(\frac{-\hat{N}_L\hat{\sigma}_L^2}{2\sigma_L^2}\right)} \quad (6)$$

where $\sigma_L^2$ is the variance of the segment L(t), $\hat{N}_L=N_L-p$ and $\hat{\sigma}_L^2$ is the covariance estimate of $\sigma_L^2$. Similarly, the test window is also modeled using AR parameters, $\alpha_S=\{\alpha_{s1},\alpha_{s2},\ldots,\alpha_{sp}\}$ and $\alpha_0=1$, $\sigma_S^2$=the variance of the segment S(t), $\hat{N}_S=N_{S-p}$ and $\hat{\sigma}_S^2$=the covariance estimate of $\sigma_S^2$.

Thus, the joint likelihood v of the two segments L(t) and S(t) is given by $$v = \left(\frac{1}{\sqrt{2\pi\sigma_L^2}}\right)^{\hat{N}_L}\left(\frac{1}{\sqrt{2\pi\sigma_S^2}}\right)^{\hat{N}_S} e^{\left(\frac{-\hat{N}_L\hat{\sigma}_L^2}{2\sigma_L^2}\right)} e^{\left(\frac{-\hat{N}_S\hat{\sigma}_S^2}{2\sigma_S^2}\right)} \quad (7)$$

This likelihood v is used to perform a binary hypothesis test based on the Generalized Likelihood Ratio. Under the hypothesis $H_1$ implying that a change is observed between the two windows, we have $\alpha_L\neq\alpha_S$ and $\sigma_L^2\neq\sigma_S^2$.

Then under $H_1$ the likelihood becomes:

$$v_1=v \quad (8)$$

and under $H_0$ the likelihood becomes:

$$v_0 = \left(\frac{1}{\sqrt{2\pi\hat{\sigma}_P^2}}\right)^{\hat{N}_L+\hat{N}_S} e^{\left(-\frac{(\hat{N}_L+\hat{N}_S)\hat{\sigma}_P^2}{2\hat{\sigma}_P^2}\right)} \quad (9)$$

where $\hat{\sigma}_P^2$ is the pooled variance of the learning and test windows. Using the maximum likelihood estimates for the variance terms in Equations 8 and 9, the likelihood ratio is therefore, given by:

$$\eta = \frac{v_0}{v_1} = \hat{\sigma}_P^{(\hat{N}_L+\hat{N}_S)}\hat{\sigma}_L^{-\hat{N}_L}\hat{\sigma}_S^{-\hat{N}_S} \quad (10)$$

For computation purposes, we use the logarithmic form of the above equation given as:

$$d=(\hat{N}_L+\hat{N}_S)\ln(\hat{\sigma}_P^2)-(\hat{N}_L\ln\hat{\sigma}_L^2+\hat{N}_S\ln\hat{\sigma}_S^2) \quad (11)$$

We refer to d as described above to be the GLR distance between the two windows. In the GLR test, then, d is compared to a reasonably chosen threshold $\delta$ to determine whether the two windows are statistically similar or not.

B. Detection of Segment Boundaries

Segment boundary detection isolates periods of abnormal behavior seen in the feature traces. The boundary points detected here are points where the behavior of the message traces deviates significantly from the period since the last segment boundary was detected. The GLR technique is used for sequential segmentation of the feature traces by imposing learning and test windows. Consider that for a feature time series, the segmentation algorithm has most recently detected a segment boundary at an arbitrary time index t=r; without loss of generality we can define r=1. The decision process necessary to detect a new boundary at an arbitrary time index s>L (L is the minimum segment length) then, is performed for all indices s>L by establishing a test window $S_t=\langle x(s),\ldots,x(s+L-1)\rangle$ and a learning window $L_t=\langle x(1),\ldots,x(s-1)\rangle$ and applying a GLR test to the sequences defined by these windows. A new segment boundary is detected whenever the GLR distance for a potential boundary position s, i.e., the GLR distance between the windows, $\langle x(1),\ldots,x(s)\rangle$ and $\langle x(s+1),\ldots,x(s+L-1)\rangle$, denoted by d(s,s+L-1) exceeds a predetermined threshold $\delta$. At this point, the time index s+L-1 is called the "detection time" $t_D$.

C. Location of Optimal Boundary Position

The main purpose of this step is to detect the exact location of the change point in the traces. This exact boundary position can be anywhere within the range $(t_D-L+1,\ldots,t_D)$. This step involves using different combinations of test window and learning window sizes to detect the position where the maximum change occurs between the two windows, hence, the name 'optimal boundary position.'

Figure 5:
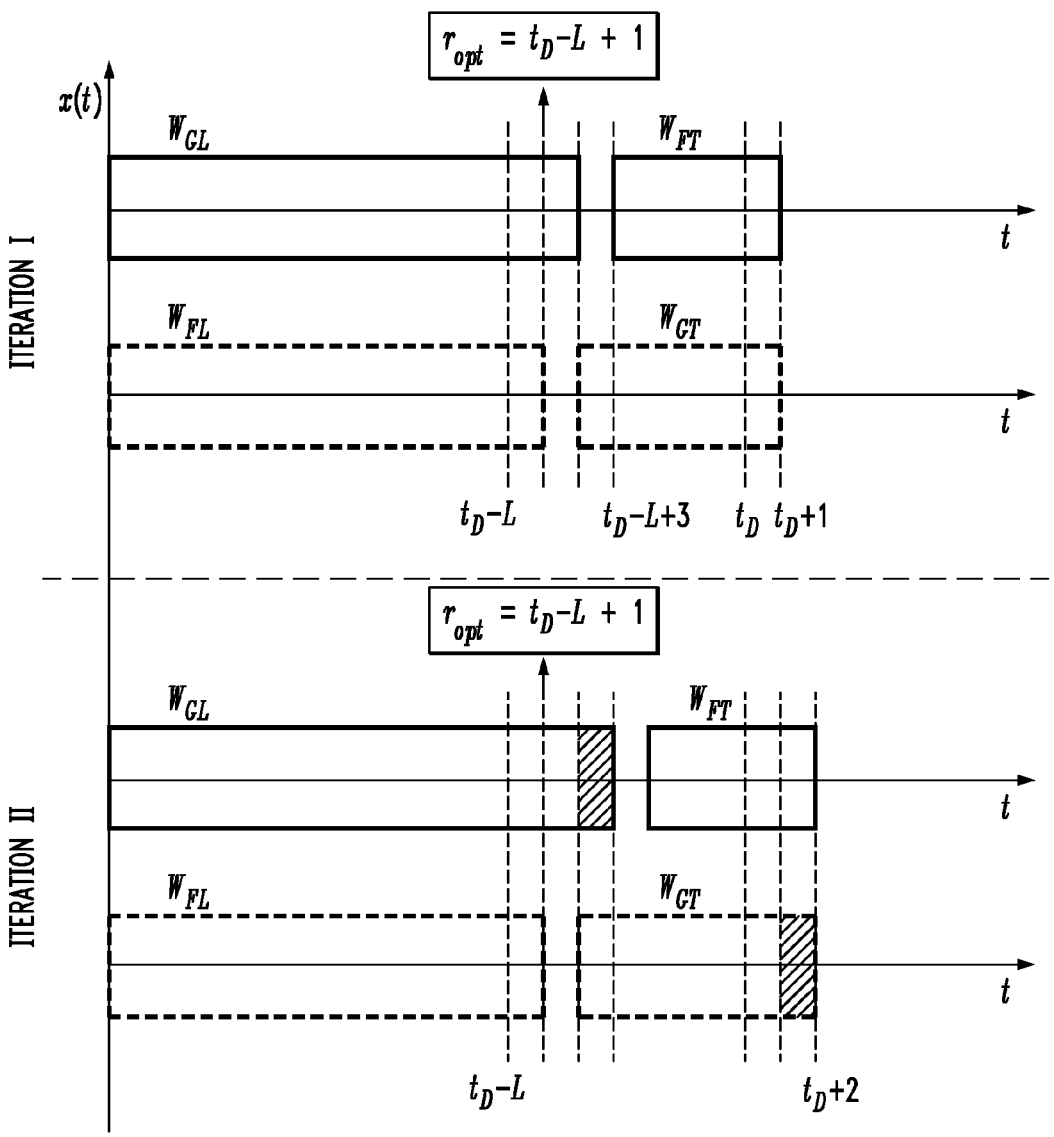
FIG. 5 illustrates iterations of an optimal boundary position algorithm, according to an embodiment of the invention.

We now describe this process in detail. Initially the optimal boundary position is assumed to be: $t_D-L+1$, Then for all other potential boundary positions within $(t_D-L+2,\ldots,t_D)$, the GLR distance between the growing learning ($W_{GL}$) and fixed test ($W_{FT}$) window is compared with the GLR distance between the fixed learning ($W_{FL}$) and growing test window ($W_{GT}$). As shown in FIG. 5, the initial windows are:

$$W_{GL}:\langle x(1),\ldots,x(t_D-L+2)\rangle \quad (12)$$

$$W_{FT}:\langle x(t_D-L+3),\ldots,x(t_D+1)\rangle,$$

$$W_{FL}:\langle x(1),\ldots,x(t_D-L+1)\rangle,$$

$$W_{GT}:\langle x(t_D-L+2),\ldots,x(t_D+1)\rangle$$

The growing window sizes increase and the fixed test window moves ahead by one at each iteration. Note, that the total length composed of both windows is identical in both cases and grows continuously. At each iteration, the GLR distance between $W_{GL}$ and $W_{FT}$ and the GLR distance between $W_{FL}$ and $W_{GT}$ is calculated. Then the new boundary position is determined based on a second tier comparison between the GLR distances between these two pairs of windows.

Note that the shaded regions of $W_{GL}$ and $W_{GT}$ of FIG. 5 indicate their growth in the next iteration. Note also that FIG. 5 shows the first two iterations of the optimal boundary position algorithm. The second iteration shown is under the assumption that the GLR distance $d(W_{GL}, W_{FL})$ is less than $d(W_{GL}, W_{FT})$ and the boundary position is not updated.

When the last potential boundary position is reached, the algorithm stops and the last allocated boundary position is the optimized boundary. Thus, at the end of the last iteration, the learning window size grows from $t_D-L+2$ to $t_D$.

For any general case, the final boundary position can be anywhere between the two extreme values $(t_D-L+1, t_D)$. Thus, the delay between the final boundary position and the detection time of the initial change point is dependant on the minimum window size L. Though locating the optimal boundary position introduces a delay in detection, it is important for the main purpose of avoiding any false alarms.

In Algorithm 1 of FIG. 4A, we present the pseudo-code for the change point detection and optimal boundary location steps. The segmentation of each of the feature traces from the set F' is carried out using the procedure described above and the allocated boundary position at the end of the optimal boundary location is said to be the time instant of the onset of an instability according to that particular trace for that particular peer.

D. Alarm Correlation

The change detection and optimal boundary location processes are applied to each feature trace from each peer and the change points detected at the end are termed as per-feature-trace alarms. In order to make the detection process more robust against volatility of feature traces, the final instability indicator is a combination of these alarms. These combinations are built using a two step process:

Step I: The alarms from the feature traces for the different values of AS path lengths (or AS path edit distances) are clustered in time using the complete linkage algorithm (see, e.g., R. Duda, P. Hart and D. Stork, "Pattern Classification, $2^{nd}$ Ed.," John Wiley and Sons, 2001). We implement this on-line as per Algorithm 2 of FIG. 4B. We define $N(a_i)$ as the neighborhood of any alarm generated by the $i^{th}$ trace. Also associated with each alarm $a_i$, we have a timer that expires at the end of a threshold $\tau$. The routines for every alarm $a_i$ and those to be run at the expiration of the timer are given in the pseudo-code. Every newly generated alarm for trace i is included in the neighborhood of an alarm $a_j$, $i \neq j$, as long as the timer for alarm $a_j$ has not expired. A background process keeps track of all the alarm neighborhoods and as soon as any neighborhood contains [n/2] change points, where n is the total number of traces, a first level alarm is generated for the AS path length (or AS path edit distance).

Figure 6:
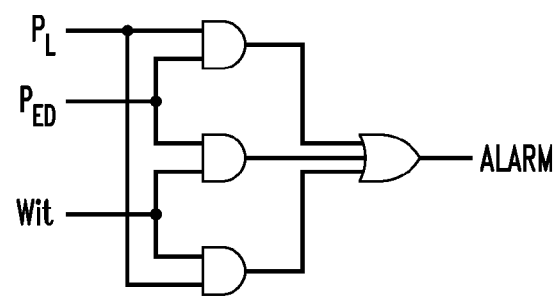
FIG. 6 illustrates logic implemented to generate an instability indicator alarm, according to an embodiment of the invention.

Step II: We cluster the alarms generated by AS Path Length, AS Path Edit Distance at end of step I and the change points detected by the Withdrawal traces in time, again using complete linkage. If the cluster strength is two or more elements, an instability-alarm is generated as logically illustrated in FIG. 6. The different pairs of features are preserved in the combination scheme for possible classification of different kinds of instabilities.

These steps are implemented separately on data from each peer and so the final alarms are generated on a per peer basis.

E. Preventing False Alarms

The use of AS path length and AS path edit distance helps to lower the false alarm rate and minimizes detection delay by maintaining a low clustering threshold $\tau$. This is a significant advantage over using just volume-based detection.

In order to ensure that we detect the instabilities correctly and do not miss any, we need the individual feature trace alarms to be as precise as possible. This is done by locating the optimal boundary in the segmentation process. We could increase the cluster threshold ($\tau$) in order to cluster a delayed change point, but this can lead to an increased number of false alarms and delay the detection of the instability.

IV. Parameter Estimation

The performance of the instability detection algorithm described above depends on the values of several parameters. The feature traces are median filtered in order to avoid capturing transient peaks. The order of the median filter is set as m=7 to suppress all peaks up to 15 minutes. The initial window size L is chosen as 20 as it has to be at least twice as large as m, to avoid using a window that is entirely smoothed out. The order of the AR process is selected on the basis of the Akaike's Information Criteria (AIC) (see, e.g., H. Akaike, "Information theory as an extension of the maximum likelihood principle," In Procs. Of the Second International Symposium on Information Theory, pp. 267-281, Budapest, Hungary, 1973). The GLR threshold value $\delta$ is learned from the data during the normal periods. The clustering threshold is chosen empirically as 50 minutes, so that the final alarm is generated within an hour of the effect of the instability being seen in the feature traces. We use datasets corresponding to three different types of events as training data to estimate these parameter values. It is important to note that while evaluating the detection algorithm, the same parameter values are maintained irrespective of the anomaly event and dataset used.

V. Controlling Route Fluctuations

In this section we enumerate the possible policies that can be invoked by policy invoker 114 of FIG. 1. Based on the number of peers that are affected by the instability, we can decide on an effective policy to be implemented.

Global Alarms: We define a "global alarm" as an alarm raised by a majority of the BGP peers. Such alarms indicate the presence of a large scale event causing an instability event and can be best managed by alerting the network operator concerned. We do not recommend invoking any control action for such widespread events.

Route Flap Damping: The first and simplest measure to be taken in case of an instability event is to activate the route flap damping and to make it more effective if already activated. To make this more effective, the penalty associated with the routes that are flapping is increased, so that many of the route fluctuations are suppressed. This can be achieved by increasing the half life associated with the route so that the rate at which its penalty decays is slower, suppressing it for a longer time. The damping mechanism will reduce the use and export of invalid intermediate routes that are received as a result of the long path explorations.

Forced route switching: When a particular peer generates an alarm it can be inferred that the cause of the instability event is either local to the peer itself or is associated with some of its remote peers. Thus, the simplest method of filtering out the instability is forcefully switching to routes learned from another peer. Thus, the local router can avoid using and exporting the fluctuating routes until the instability is declared as over by feature tracker 108 of FIG. 1.

Forced Withdrawals: All routes that are received from the peer that raised an instability indicator alarm are forced to be withdrawn if an alternate route is not found through another peer, as suggested above. Again, these routes can remain withdrawn until the instability symptoms cease to exist.

Origin Identification: If the alarms identify the instability as "global" and most of the prefixes belong to a small number of origin ASs, then the most probable location of the instability is an AS very close to these origin ASs, i.e., their common provider or peer. In such a case, forcing withdrawals of all the routes to prefixes belonging to these ASs according to the method described above would be an effective way of suppressing the route fluctuations.

All the above policies can be implemented simply by setting the routes that match certain conditions as non-permissible routes. The routes will still be stored in the Adj-RJBS-IN of the router, they will just not be used for the route selection process until the instability conditions persist. The main concept behind these policies is to simply quarantine the routes that seem to be affected by the instability.

VI. Processing Architecture

Figure 7:
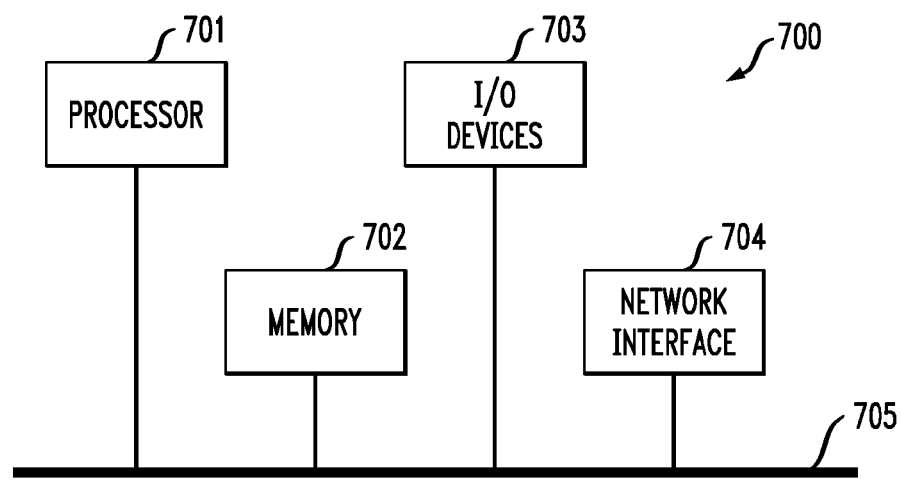
FIG. 7 illustrates a processing architecture of an inter-domain router, according to an embodiment of the invention.

FIG. 7 illustrates an architecture of a processing system suitable for implementing an instability detection system, according to an embodiment of the invention. More particularly, it is to be appreciated that processing system 700 in FIG. 7 may be used to implement and perform the methodologies of the invention, as illustratively described above in the context of FIG. 1 through FIG. 6. According to one embodiment of the invention, processing system 700 is implemented in a single BGP router. It is to be understood that the invention is not limited to any particular computing system implementation.

In this illustrative implementation, a processor 801 for implementing at least a portion of the methodologies of the invention is operatively coupled to a memory 802, input/output (I/O) device(s) 803 and a network interface 804 via a bus 805, or an alternative connection arrangement.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism to provide inputs used by a system of the invention. Alternatively, the inputs could be read into the system from a diskette or from some other source (e.g., another computer system) connected to the computer bus 805. Also, inputs to the methodologies may be obtained in accordance with the one or more input devices. The output devices may be one mechanism for a user or other computer system to be presented with results of the methodologies of the invention.

Still further, the phrase "network interface" as used herein is intended to include, for example, one or more devices capable of allowing system 700 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while the present invention has been described herein in the context of networks, the methodologies of the present invention may be capable of being distributed in the form of computer readable media, and that principles of the present invention may be implemented, and its advantages realized, regardless of the particular type of media actually used for distribution. The term "computer readable media" as used herein is intended to include recordable-type media, such as, for example, a floppy disk, a hard disk drive, RAM, compact disk (CD) ROM, etc.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by processor 801.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of detecting an instability event in a communications system supporting inter-domain routing among a plurality of administrative domains, comprising steps of:

extracting, at an inter-domain router, a plurality of features from one or more messages obtained from at least another router in the communications system, wherein the plurality of extracted features comprise at least: a path length feature, a path edit distance feature and a message volume feature;

generating, at the inter-domain router, a time series trace collected over a given time interval, the time series trace tracking the plurality of extracted features over the given time interval, the time interval comprising one or more windows;

filtering, at the inter-domain router, the plurality of extracted features, wherein the filtering comprises identifying one or more peaks of each of the plurality of extracted features in the time series trace and determining whether a peak is identified for two or more of the plurality of extracted features in a given one of the one or more windows of the time series trace; and detecting, at the inter-domain router, whether an instability event has occurred in the communications system based on the plurality of filtered extracted features such that an action can be effectuated;

wherein the filtering further comprises discarding a given one of the one or more peaks when a duration of the given peak is less than a specified time and wherein a duration of each of the one or more windows of the time series trace is at least twice as long as the specified time;

wherein the path length feature is based on a number of hops in a particular path;

wherein the path edit distance features is based on a number of substitutions, deletions, or insertions, or combinations thereof, to convert one path into another path; and wherein the message volume feature is based on a number of announcement and withdrawal messages exchanged between the plurality of administrative domains.

2. The method of claim 1, wherein the detecting step performs a statistical analysis on the time series trace.

3. The method of claim 1, wherein the one or more messages comprise one or more border gateway protocol update messages.

4. The method of claim 1, wherein the inter-domain router is a border gateway protocol router.

5. The method of claim 1, wherein the action to be effectuated comprises invocation of an instability event policy.

6. The method of claim 1, wherein the action to be effectuated comprises generating an alarm to signal the occurrence of an instability to a network operator.

7. The method of claim 1, wherein the message volume feature comprises a withdrawal message volume feature.

8. The method of claim 1, wherein the detecting step comprises an adaptive sequential segmentation process.

9. The method of claim 1, wherein the detecting step comprises a generalized likelihood ratio based hypothesis test.

10. The method of claim 1, wherein the detecting step comprises determining an optimal boundary position within the times series trace.

11. The method of claim 10, wherein the optimal boundary position determining step further comprises use of a test window and a learning window for making the optimal boundary position determination.

12. The method of claim 11, wherein the optimal boundary position determining step further comprises using different combinations of sizes of the test window and the learning window to detect a position where a maximum change occurs between the two windows.

13. The method of claim 1, wherein the detecting step further comprises correlating results of the statistical analysis of two or more feature traces prior to effectuating the action.

14. An article of manufacture for detecting an instability event in a communications system supporting inter-domain routing among a plurality of administrative domains, the article comprising a non-transitory machine recordable storage medium containing one or more programs stored thereon which when executed by a processor implement steps of:
   extracting, at an inter-domain router, a plurality of features from one or more messages obtained from at least another router in the communications system, wherein the plurality of extracted features comprise at least: a path length feature, a path edit distance feature and a message volume feature;
   generating, at the inter-domain router, a time series trace collected over a given time interval, the time series trace tracking the plurality of extracted features over the given time interval, the time interval comprising one or more windows;
   filtering, at the inter-domain router, the plurality of extracted features, wherein the filtering comprises identifying one or more peaks of each of the plurality of extracted features in the time series trace and determining whether a peak is identified for two or more of the plurality of extracted features in a given one of the one or more windows of the time series trace; and
   detecting, at the inter-domain router, whether an instability event has occurred in the communications system based on the plurality of filtered extracted features such that an action can be effectuated;
   wherein the filtering further comprises discarding a given one of the one or more peaks when a duration of the given peak is less than a specified time and wherein a duration of each of the one or more windows of the time series trace is at least twice as long as the specified time;
   wherein the path length feature is based on a number of hops in a particular path;
   wherein the path edit distance features is based on a number of substitutions, deletions, or insertions, or combinations thereof, to convert one path into another path; and
   wherein the message volume feature is based on a number of announcement and withdrawal messages exchanged between the plurality of administrative domains.

15. Apparatus for detecting an instability event in a communications system supporting inter-domain routing among a plurality of administrative domains, comprising:
   a memory; and
   a processor coupled to the memory and operative to: extract, at an inter-domain router, a plurality of features from one or more messages obtained from at least another router in the communications system, wherein the plurality of extracted features comprise at least: a path length feature, a path edit distance feature and a message volume feature; generate, at the inter-domain router, a time series trace collected over a given time interval, the time series trace tracking the plurality of extracted features over the given time interval, the time interval comprising one or more windows; filter, at the inter-domain router, the plurality of extracted features, wherein the filtering comprises identifying one or more peaks of each of the plurality of extracted features in the time series trace and determining whether a peak is identified for two or more of the plurality of extracted features in a given one of the one or more windows of the time series trace; and detect, at the inter-domain router, whether an instability event has occurred in the communications system based on the plurality of filtered extracted features such that an action can be effectuated;
   wherein the filtering further comprises discarding a given one of the one or more peaks when a duration of the given peak is less than a specified time and wherein a duration of each of the one or more windows of the time series trace is at least twice as long as the specified time;
   wherein the path length feature is based on a number of hops in a particular path;
   wherein the path edit distance features is based on a number of substitutions, deletions, or insertions, or combinations thereof, to convert one path into another path; and
   wherein the message volume feature is based on a number of announcement and withdrawal messages exchanged between the plurality of administrative domains.

16. The apparatus of claim 15, wherein the inter-domain router is a border gateway protocol router.

17. The apparatus of claim 15, wherein the one or more messages comprise one or more border gateway protocol update messages.

18. An inter-domain router configured to detect an instability event in a communications system supporting inter-domain routing among a plurality of administrative domains, comprising:
   a feature extractor for extracting a plurality of features from one or more messages obtained from at least another router in the communications system and generating a time series trace collected over a given time interval, wherein the plurality of extracted features comprise at least: a path length feature, a path edit distance feature and a message volume;
   a feature tracker, coupled to the feature extractor, for generating a time series trace collected over a given time interval, the time series trace tracking the plurality of extracted features over the given time interval, the time interval comprising one or more windows;

a change detector, coupled to the feature extractor, for identifying one or more peaks of each of the plurality of extracted features in the time series trace;

an alarm correlator, coupled to the change detector, for determining whether a peak is identified for two or more of the plurality of extracted features in a given one of the one or more windows of the time series trace; and a policy invoker, coupled to the alarm correlator and the feature tracker, for detecting whether an instability event has occurred in the communications system based on the one or more extracted features such that an action can be effectuated;

wherein the change detector is configured to discard a given one of the one or more peaks when a duration of the given peak is less than a specified time and wherein a duration of each of the one or more windows of the time series trace is at least twice as long as the specified time;

wherein the path length feature is based on a number of hops in a particular path;

wherein the path edit distance features is based on a number of substitutions, deletions, or insertions, or combinations thereof, to convert one path into another path; and wherein the message volume feature is based on a number of announcement and withdrawal messages exchanged between the plurality of administrative domains.

19. The method of claim 1, wherein the extracted path length feature represents a measure of the number of messages with inter-administrative domain path lengths that differ from a given path length value such that an instability event is detected when said number of messages is greater than a given maximum value.

20. The method of claim 1, wherein the extracted path edit distance feature represents a measure of the number of messages with path edit distances being greater than a given path edit distance value such that an instability event is detected when said number of messages is greater than a given maximum value.

* * * * *